(12) United States Patent
Tarves, Jr. et al.

(10) Patent No.: US 9,183,097 B2
(45) Date of Patent: Nov. 10, 2015

(54) VIRTUAL INFRASTRUCTURE RECOVERY CONFIGURATOR

(71) Applicant: SunGard Availability Services, LP, Wayne, PA (US)

(72) Inventors: William J. Tarves, Jr., Somerdale, NJ (US); Haim Glickman, Jamison, PA (US)

(73) Assignee: SUNGARD AVAILABILITY SERVICES, LP, Wayne, PA (US)

( * ) Notice: Subject to any disclaimer, the term of this patent is extended or adjusted under 35 U.S.C. 154(b) by 189 days.

(21) Appl. No.: 13/910,623

(22) Filed: Jun. 5, 2013

(65) Prior Publication Data

US 2014/0365822 A1 Dec. 11, 2014

(51) Int. Cl.
*G06F 11/14* (2006.01)
(52) U.S. Cl.
CPC .................. *G06F 11/1469* (2013.01)
(58) Field of Classification Search
CPC ............ G06F 11/1469; G06F 11/1484; G06F 11/2048; G06F 11/2097; G06F 11/1461; G06F 11/2025; G06F 11/2094; G06F 11/301; G06F 9/45558; G06F 9/45533
See application file for complete search history.

(56) References Cited

U.S. PATENT DOCUMENTS

| 7,194,444 | B1 | 3/2007 | Nichols |
| 7,467,378 | B1 | 12/2008 | Sobel |
| 7,971,094 | B1 | 6/2011 | Benn et al. |
| 8,056,082 | B2 | 11/2011 | Koretz et al. |
| 8,166,552 | B2 | 4/2012 | Prafullchandra et al. |
| 8,352,608 | B1* | 1/2013 | Keagy et al. ................... 709/226 |
| 8,566,640 | B2* | 10/2013 | Timashev et al. ............... 714/15 |
| 8,621,274 | B1* | 12/2013 | Forgette et al. ................. 714/10 |
| 2006/0047720 | A1* | 3/2006 | Kulkarni et al. ............... 707/204 |
| 2010/0058114 | A1 | 3/2010 | Perkins et al. |
| 2011/0137866 | A1* | 6/2011 | Shin et al. ...................... 707/648 |
| 2011/0231899 | A1 | 9/2011 | Pulier et al. |
| 2011/0258481 | A1* | 10/2011 | Kern .............................. 714/4.1 |
| 2012/0284236 | A1* | 11/2012 | Timashev et al. ............. 707/674 |
| 2013/0007506 | A1* | 1/2013 | Jain et al. ..................... 714/4.12 |
| 2013/0019240 | A1* | 1/2013 | Tsirkin et al. ..................... 718/1 |

FOREIGN PATENT DOCUMENTS

EP 2645253 2/2013

OTHER PUBLICATIONS

Product Datasheet for "Datacenter as a Service: Cloud Management Center," DAAS.com, 2011 Awingu.com, 5 pages.
Product Datasheet for "What is VMware vCenter Site Recovery Manager," VMware vCenter Site Recovery Manager 5.1, VMware, Inc. Jun. 2012, 4 pages.

(Continued)

*Primary Examiner* — Nadeem Iqbal
(74) *Attorney, Agent, or Firm* — Cesari and McKenna LLP

(57) ABSTRACT

Systems, methods and procedures to capture, format and process configuration information needed for a Managed Recovery Program (MRP) solution that supports orderly handling of virtual machines in an information technology production environment. An MRP automation package is portable and contains all of the required configuration data to bring virtual infrastructure on line in a recovery environment as well as associated scripts that can be executed to automatically process the configuration data.

21 Claims, 8 Drawing Sheets

(56) References Cited

OTHER PUBLICATIONS

Product Datasheet for "VMware vCenter Converter" VMware vCenter Converter, Convert Physical Machines to Virtual Machines, www.vmware.com/Products/converter/, 2013 VMware, Inc., 2 pages.

Product Datasheet for "Automatically Discover Application Services," VMware vCenter Infrastructure Navigator, www.vmware.com/products/datacenter-virtualization/vcenter-infrastructure-navigator, 2013, VMware, Inc., 2 pages.

Product Datasheet for "Cloud Services Savvis Symphony Virtual Private Data Center (VPDC)," Savvis, A CenturyLink Company, Savvis IT Infrastructure, 2012, CenturyLink, Inc., 4 pages.

Product Datasheet for "Reflex vProfile Configuration Management," Reflex Systems, www.reflexsystems.com, 2013, 2 pages.

"VMware vCenter Site Recovery Manager" available from http://www.vware.com/files/pdf/vmware-vcenter-site-recovery-manager-DS-EN.pdf [accessed Nov. 27, 2014] 2 pages.

Combined Search and Examination Report under Sections 17 and 18(3) mailed Dec. 5, 2014 for Application No. GB1409910.5 filed Jun. 4, 2014 for Sungard Availability Services, LP, 10 pages.

VMware ESX and VMware ESXi The Market Leading Production-Proven Hypervisors Product Datasheet, Copyright © 2009 VMware, Inc., 6 pages.

* cited by examiner

VIRTUAL INFRASTRUCTURE RECOVERY CONFIGURATOR

BACKGROUND

1. Technical Field

This patent application relates to data processing, and in particular to managed recovery of the virtual infrastructure in an Information Technology (IT) system.

2. Background Information

Disaster Recovery (DR) is a strategy including people, processes, policies, and technologies for restoring IT systems in the event of a failure. It is also increasingly popular to utilize virtualization tools to enable the most efficient use of IT resources. However, recovering the virtual infrastructure needed to support an environment for a Managed Recovery Program (MRP) is a long and complex task where even small mistakes can cause the overall system to malfunction. Large environments can contain dozens of physical servers that must be precisely configured with hundreds of settings. These settings must be made in a consistent way across a subset of devices in order for all devices to work together correctly.

Within a typical IT production environment, configuration information for these settings is spread across multiple documents. Recovery procedures are also quite susceptible to frequency changes, which are difficult to transmit among systems operators. Additionally, many times the virtual infrastructure itself must be recovered first, before the data recovery can begin.

There are many known approaches to automating disaster recovery and solving the associated administrative problems inside an enterprise. One way is to use the Virtual Machine (VM) restoration solutions from vendors such as NetBackup (available from Symantec Corporation of Sunnyvale, Calif.; Simpina by CommVault Systems of Oceanport, N.J.; and backup products available from Veeam Software AG of Baar, Switzerland. However implementation of those solutions requires not only the underlying hardware infrastructure, but also virtual networking, storage sub systems and the like to already be recovered.

VMware's vCenter Site Recovery Manager (available from VMware, a subsidiary of EMC Corporation of Hopkinton, Mass.) can be used to replicate virtual machines to a secondary site, and supports automated recovery plans.

Other solutions exist for automated detection and management of configuration information as explained in a U.S. patent application Ser. No. 13/353,652 filed Jan. 19, 2012 entitled "Automated Configuration Error Detection and Prevention"; it is also known that a managed recovery service can use configuration information to recover logical domains as explained in U.S. patent application Ser. No. 13/752,835 filed Jan. 29, 2013 entitled "Logical Domain Recovery". Each of these patents are assigned to SunGard Availability Services, LP the same assignee of the present application and each are incorporated by reference herein.

SUMMARY

Described here are systems, methods and procedures to capture, format and process configuration information needed for a Managed Recovery Program (MRP) solution that support orderly handling of virtual machines. While the individual components of the automation such as registering a host or deploying a virtual machine may have been known in the past, the ability to compile an MRP automation package that is portable and contains all of the required and detailed configuration data as well as the associated scripts needed to automatically process the configuration data is believed to be unique.

In one aspect, a Virtual Infrastructure Recovery Configurator (VIRC) allows a single operator the ability to automate the configuration of an unlimited number of devices. By providing the properly formatted data files to the system, the operator can view all the configuration information for the production environment to be recovered, validate this information, and make any required changes or updates. Once the configurations have been validated the operator can integrate the package into the target recovery environment to ensure that the proper resources available and to begin processing the configuration data with the scripts.

One of the key features of the configurator is that it allows for an easily repeatable and consistent execution. Another benefit of this solution is improved accuracy of the configuration data stored in the data files—previously, this information may be prone to human error in the capture and retention process, thus resulting in issues with DR test execution.

Some of the functions supported are:

1.) Configuration of available recovery hardware and virtualization hosts. This solution creates a portable "package" that consists of configuration details (data files) and a software application that perform configurations on available target hardware available in the recovery environment.

2.) Creation and configuration of Virtual Machines. This solution allows for an operator to specify the configuration details (host names, operating system, hardware specifications, network configurations, etc.) and any number of virtual machines required to be deployed in the recovery environment. The approach increases the efficiency of Physical-to-Virtual (p2v) recoveries by automating the creating of the virtual machine shells that are required to accept the data restored from physical machine backups.

3.) Submission of Restore requests (jobs) to a Backup/Recovery software suite.

4.) Registration of Virtual Machines into the recovery environment.

5.) Mass configuration changes across multiple virtualization hosts. This solution offers an operator the ability to submit a configuration change that will affect multiple hosts, by allow an operator to specify a configuration change only once and have that change be performed on all or a subset of hosts in the recovery environment.

BRIEF DESCRIPTION OF THE DRAWINGS

The description below refers to the accompanying drawings, where.

DETAILED DESCRIPTION OF AN EXAMPLE EMBODIMENT

In a method according to one specific implementation, configuring data is collected from a production system into properly formatted files (which may be, in one implementation, comma separated value "CSV" files). An operator might manually create these files or these files may be captured automatically from the production environment. The configuration files, along with an automation application (which may be implemented as a collection of Microsoft™ PowerShell scripts) constitute an "Automation Package". The automation package is a portable set of files and there fore does not require a persistent connection to any command or control system.

Once this automation package is compiled the operator executes it against a recovery system installation that has access to target hardware (hosts). The automation scripts are then executed to perform the requested virtual machine configurations in the recovery environment.

Figure 1:
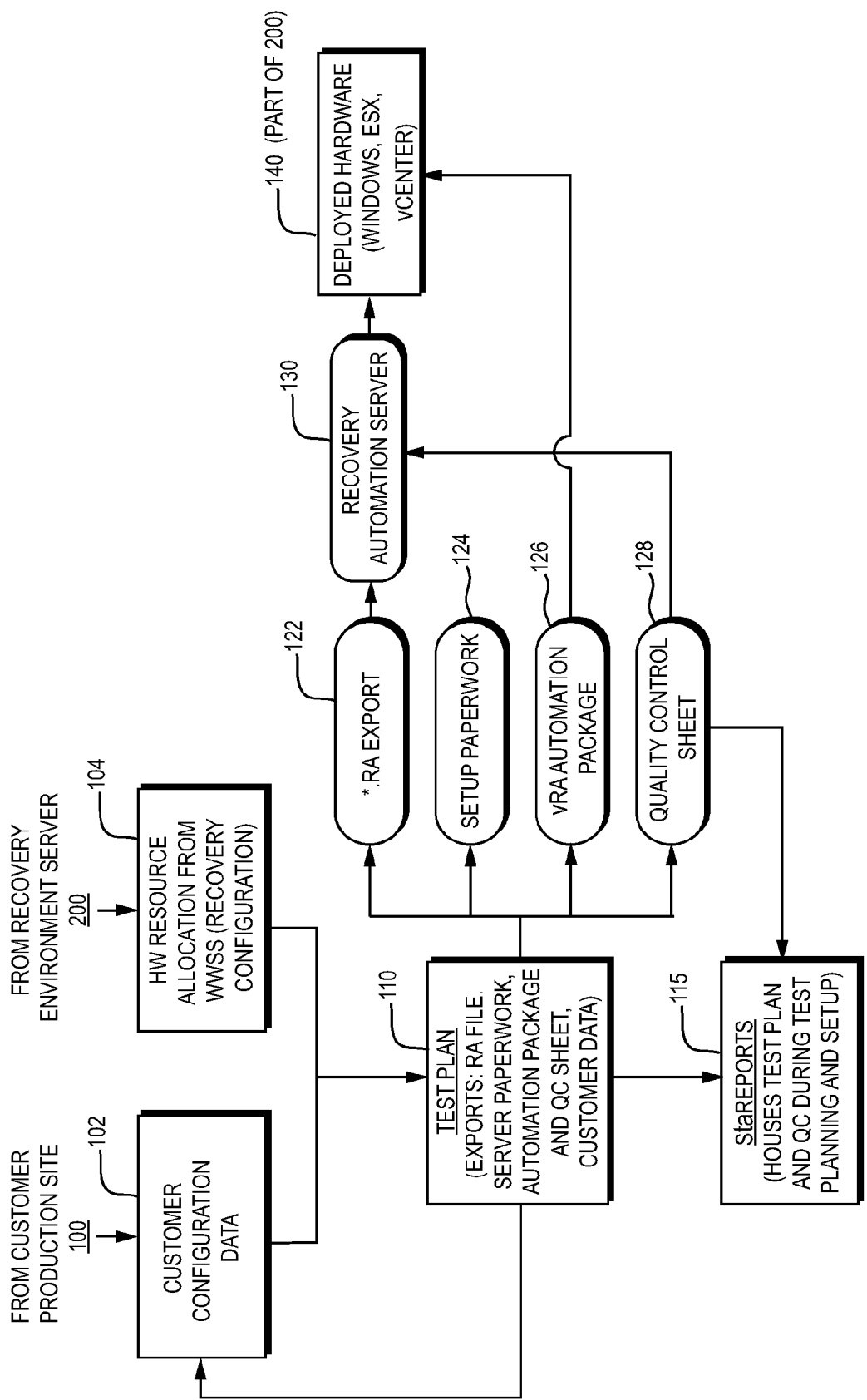
FIG. 1 is a high level test execution process flow that uses a virtual recovery automation package.

More specifically, FIG. 1 is a high-level diagram of a data processing environment which a Managed Recovery Process (MRP) and system may be implemented. It should be understood that this is but one example environment and many others are possible. The goal is to permit orderly recovery of a production environment 100 in a recovery environment 200. The recovery process and system should operate automatically, to the extent possible, but still provide some level of visibility to an administrative user 300 who can specify certain options to tailor the recovery process according to their needs.

An example production environment 100 consists of one or more physical data processors such one or more physical server(s), which typically will have access to other physical data processing infrastructure elements such as storage and network devices. These infrastructure elements need not are not be so limited, and may further include infrastructure elements that are not shown in FIG. 1, such as other types of physical networking equipment such as routers, switches, and firewalls, or other data processing equipment such as servers, load balancers, storage subsystems, and the like. The servers may include web servers, database servers, application servers, storage servers, security appliances or other type of machines. Each server typically includes an operating system, application software, and other data processing services, features, functions, software, and other aspects.

In a preferred arrangement, the production environment runs an operating system (OS) or hypervisor that supports virtualization and in particular the OS or hypervisor may support running multiple virtual machines (VMs) on a single physical machine. It should be understood that a production server may be a data processor that the user physically maintains in their own facility or the server may be "in the cloud" from the perspective of the user and thus remotely located.

The administrative user responsible for ensuring orderly operation of the production environment 100 has also arranged for access to recovery services, such as by a managed recovery service that provides recovery environment 200. The managed recovery service is typically operated by third-party data processing service provider and makes available still further virtual machine resources. These additional virtual machine resources enable the administrative user to replicate their production environment 100 in a recovery environment 200. It becomes desirable therefore to enable orderly replication of all or a subset of the resources configured in the production environment 100 to be instantiated within the recovery environment 200.

Recovery environment 200 thus consists of a one or more physical servers (also called "hot sites") and corresponding virtual or physical peripherals such as storage and networking devices. The recovery server(s) typically should also execute the same type of operating system as used in the production environment 100.

FIG. 1 further illustrates a high level process flow for execution of a test such as a disaster recovery (DR) test in the context of, for example, a Managed Recovery Program (MRP) DR plan. The process takes inputs including information concerning the configuration of a production IT environment 100 and hardware resource allocation information such as provided by a recovery service provider 200. The recovery service provider 200 makes available certain equipment such as hardware, operating systems and virtualization tools. One such example recovery environment, to be discussed herein in detail, makes use of VMware Infrastructure™ a computer hardware virtualizaton product available from VMware, Inc. (a subsidiary of EMC Corporation of Hopkinton, Mass.). The VMware components can include ESX®, a bare metal embedded hypervisor for managing guest virtual servers, and tools such as a Center Server®, a server that provides management of multiple ESX servers and their associated virtual machines (ESX and vCenter Server are also trademarks of VMware, Inc.).

The customer configuration data 102 is information obtained from the production environment 100. This configuration information contains, for example, Internet Protocol (IP) addresses, Operating System information, hardware configuration and other information associated with the infrastructure elements in the production environment 100 to be replicated in a managed recovery service environment 200. The IT system in the production may for example be a personal computer-based local area network (PCLAN) but may included many other types of data processing systems.

Hardware resource allocation information 104 is obtained from a scheduling system controlled by the recovery service provider 200. In the present example, this is referred to as a WorldWide Scheduling System (WWSS) that identifies which physical equipment is presently available from the recovery service provider 200. It should be understood that the available hardware resource allocation typically changes all the time. For example at first point in time there may be ten (10) physical servers reported as available by the WWSS. Shortly thereafter, that may only be five (5) servers available. At a still later time, there may be a larger number of servers reported as being available (such as 20). The hardware resource allocation information 104 is typically provided in a text document that is human-readable but any electronic format can be made to work.

Also key to the present discussion is the test plan logic 110. The test plan 110 receives the customer configuration information 102 and the hardware resource allocation information 104 and generates a number of outputs. These outputs may include a recovery automation (.RA) export file 122, a virtual recovery automation (VRA) package 126 and associated documentation such as set up paperwork 124 and quality control sheets 128.

The test plan 110 may be generated iteratively through interaction with a human operator.

The RA export files 122 contain information necessary to configure the physical hardware is available from the recovery service provider. The RA export files are forwarded to a recovery automation server 130 that interacts with the actually available hardware 140 as deployed in the recovery environment 200 and as reported by the WWSS. The recovery automation server 130 then brings online the deployed hardware and associated operating systems (such as Windows, Linux, OS X, etc.) and the aforementioned hypervisors (such as ESX) and/or management servers (such as Vcenter).

The VRA automation package 126 includes two particular pieces—configuration data (item 600 discussed in detail below) and an automation script (see 650 below). The configuration data includes information necessary to restore and/or configure the rest of the infrastructure such as hosts, clusters, network and storage information that also enable virtual machines to be restored. The recovery automation scripts may utilize an appropriate task automation framework such as Microsoft's PowerShell tool.

In this manner, the VRA automation package 126 supports recovery of large-scale infrastructure production environments deployments on recovery environments that may vary on an instantaneous basis. By providing the formatted configuration data files to the recovery system, the operator can make any required changes or updates in the iterative process while developing the test plan 110. Once the configurations have been validated (via iteration as discussed above) the operator can integrate this into the target recovery environment to ensure the proper resources are available, and that they will be configured in a consistent manner regardless of the availability of particular types or of particular numbers of deployed hardware 140.

Generation of a test plan 110 may also result in status reports 115, quality control procedures 150 and so forth, the details of which are not germaine to the present discussion.

Figure 2:
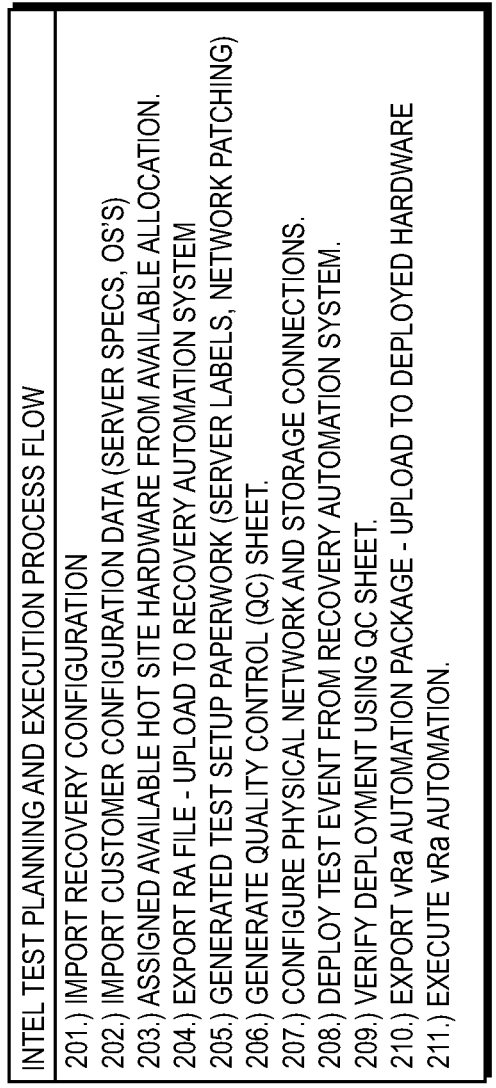
FIG. 2 is a more detailed example process.

Turning to attention to FIG. 2 a typical test plan and its execution process flow will now be described in more detail. In step 201 the recovery configuration—specifically at least the hardware resource allocation 104 information is imported.

In step 202, customer configuration data 102 is imported from the production environment 100. In step 203 the available hot site hardware such as reported via the hardware resource allocation 104 is requested and assigned.

In step 204 the recovery automation export file 122 is uploaded to the recovery automation server 130. This initiates deployment of the available allocated physical hardware 140.

In step 205 any generated test setup paperwork 124 is performed such as server labels and network patching. In step 206, quality control sheets may be generated.

In step 207 the physical network and storage connections available to the deployed hardware 140 are configured by the recovery automation server 130.

In step 208 the test event is deployed from the recovery automation server 130. This deployment is verified in step 209 using the quality control sheet 128 for example. In step 210 the VRA automation package is exported by uploading it to the deployed hardware 140. In step 211 the VRA automation script 126 can then be executed.

In summary, the recovery automation server 130 thus first deploys the available hardware 140. Subsequent to that, the VRA automation package 126 waits until the recovery automation server 130 reports that that the hardware 140 has been deployed. At this point, the VRA package 126 scripts and configuration data can be copied over to the deployed hardware 160 and the scripts 126 can then be executed against the configuration data 120. In other words, once the recovery automation server brings up the available hardware, the VRA package can then invoke the virtual recovery process in full.

Figure 3:
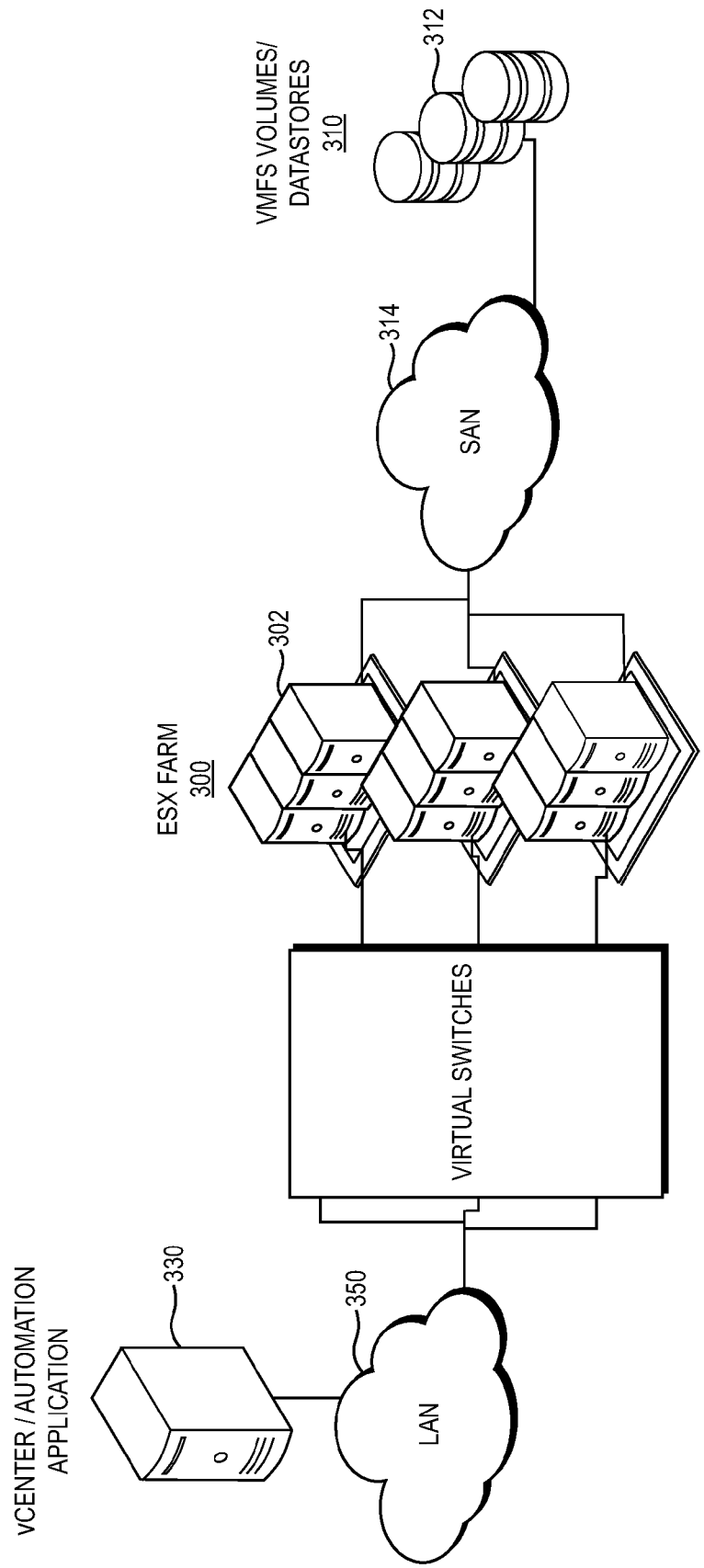
FIG. 3 is a diagram showing typical hardware deployed in the recovery environment.

FIG. 3 illustrates an example set of hardware resources brought online as a result of the recovery automation export 122. Various physical infrastructure elements are brought online but not yet completely configured as a result. The example shown is a VMware environment which multiple physical ESX servers 302 brought online from a server farm 300 and allocated to the customer. In addition, a number of data stores 310 (which may include one or more physical volumes 312) are brought online and allocated. At this point also brought online are some low-level storage area network functionality 314 such as zoning, enabling the servers 302 to access the data stores 310. At this point a management server such as a VCenter compatible server 330 may also be enabled and connected physically via a local area network 315 to the allocated ESX servers 302 and data stores 314. At this point the servers 302 may be configured with Internet Protocol (IP) addresses in LAN 350 but no higher-level constructs have been initiated. As will be understood shortly, the remainder of the configuration needed is handled by the automation script portion of package 126.

Figure 4:
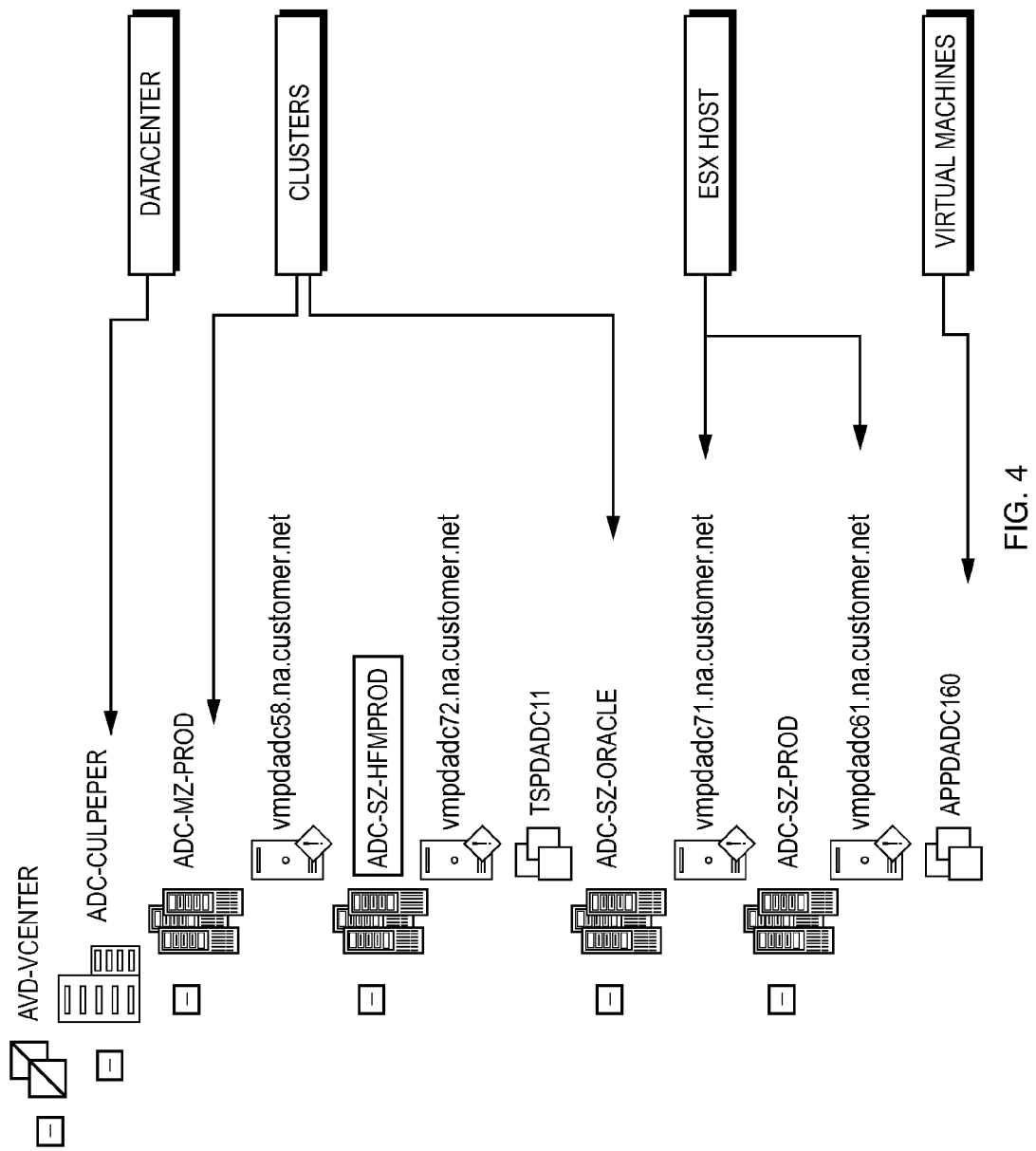
FIG. 4 is an example data center hierarchy diagram.

FIG. 4 is a hierarchy diagram that a user may view through a Vcenter 330 interface. The data center has been brought online with a name "BDC-Culpepper" but at this point no other configurations have been initiated. It is only after the VRA script 126 is executed by the Vcenter server 330 will further elements of the hierarchy shown, such as data center, clusters, ESX hosts, and virtual machines, be configured and enabled.

Figure 5:
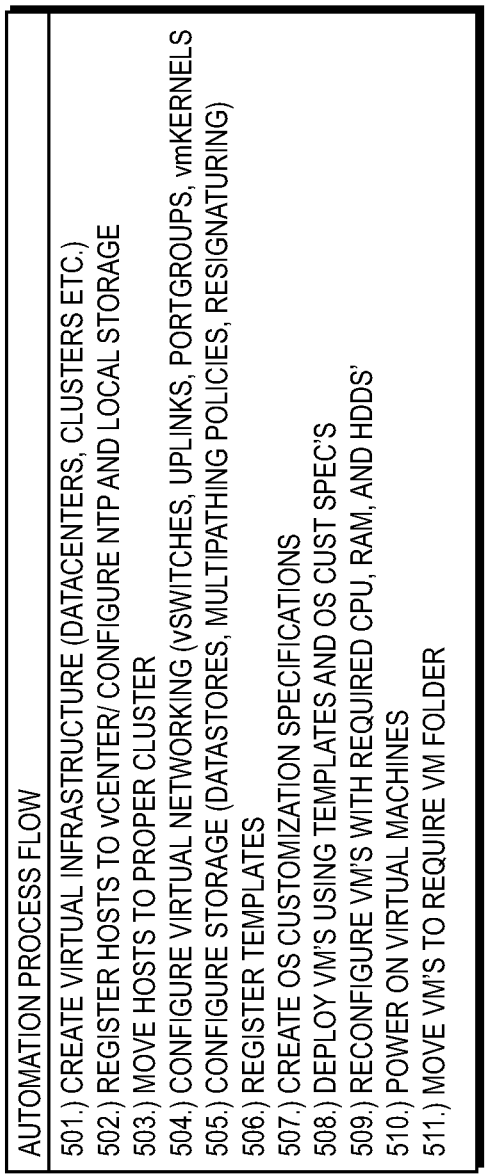
FIG. 5 is example logic for an automation process program script.

FIG. 5 illustrates a typical automation process flow for high-level logical steps performed by the automation scripts. In a first step 501 the virtual infrastructure such as data centers, clusters, and so forth are created. In a next step 502, hosts are registered to Vcenter and any local storage are configured. In step 503, hosts are moved to their appropriate clusters.

In step 504, virtual networking elements can then be configured and optionally verified. These may include virtual switches, uplinks, port groups, VM kernels and the like according to the VRA script 126.

In step 505 data stores can be configured and optionally verified including their associated multi-pathing policies and so forth.

In a next step 506 a virtual machine template can be registered. In one implementation, these virtual machine templates can be treated as a "read only" version of a virtual machine. There may be a master copy of a required OS deployment that is treated as a "gold" configuration, with the proper software, updates, and patches already present on the system. In step 507 operating system customization specifications may be created and then used to customize the "gold" template with specifics for a particular server (e.g., name, IP address, etc.) as found in the associated configuration data file(s).

In step 508 virtual machines are deployed using the available templates from the operating system customer specification. The available virtual machines may be assigned to the hosts in a number of different ways, including round robin among all available machines, according to a subset of available machines, or according to specifications in the VRA script file(s). In step 509 the VMs are preconfigured with the required CPU, RAM, hard drives so forth. In step 510 the virtual machines can be powered on, and in step 511 the virtual machines can be moved to the required "folder." Maintaining the virtual machines in folders can be useful for organizational purposes. Large enterprises may have hundreds of virtual machines in a given vCenter environment; by using these folders as an organization tool, an operator can more easily location a specific virtual machine. While one way to organize folders is based on the application that the virtual machine supports, other folder structures are possible.

Figure 6:
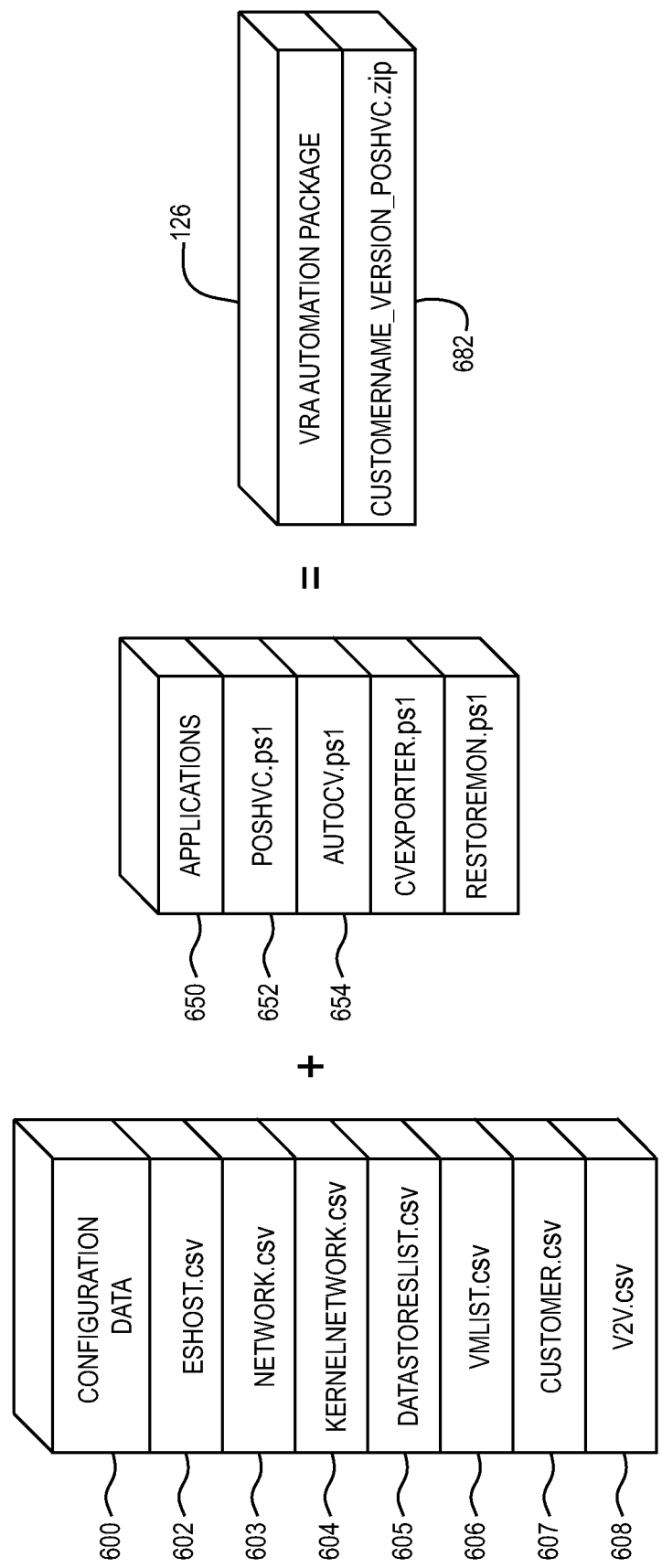
FIG. 6 shows the contents of the recovery automation package.

FIG. 6 shows an example VRA package 126 and its two components—configuration data 600 and executable scripts (also known as application programs) 650. Associated with the configuration of data 600 and are hosts 602, networks 603, kernel networks 604, data stores 605, virtual machines 606, customer information 607, and virtual to virtual (V2V) recovery information 608. The configuration data 600 may be maintained in text files which may be for example, comma separated value (CSV) files, or in other file formats.

The VRA applications portion 650 may include a number of scripts such as a "poshVC" script 652 and an "autoCV" script 654. It should be understood that the automation package 1260 may also include identification information such as customer name versions and so forth.

The poshVC script 652 may be responsible for creating configuring virtual machines and the VMware virtual be center and ESX hosts. The autoCV script 654 may be responsible for submission of restore requests. PoshVC 652 may also be responsible for registration of virtual machines.

The scripts are in general responsible for a number of functions, among these including Configuration of the Vcenter 330 and ESX hosts 302.
Creation and configuration of virtual machines.
Submission of restore requests (such as in a form of jobs) to a backup recovery software suite running in the VCenter server 330.
Registration of virtual machines into the VCenter 330 environment.
Managing mass configuration changes across multiple ESX hosts 302.

The automation package 126 is portable and does not require a persistent connection to any command or control system to be managed. Once this automation package 126 is compiled the operator can execute it against the VCenter 330 installation that has access to the required target hardware (such as ESX farm 300).

The automation package then performs the requested higher-level virtual machine configurations. This can first start by configuring the required VCenter hierarchy by producing a unique list of data centers and clusters from the provided data. Once these containers have been created, the automation package can then process the ESXhost.CSV file 602 and register the listed targets into the VCenter 330 and moving them into the appropriate place in the hierarchy (see FIG. 4).

Figure 7:
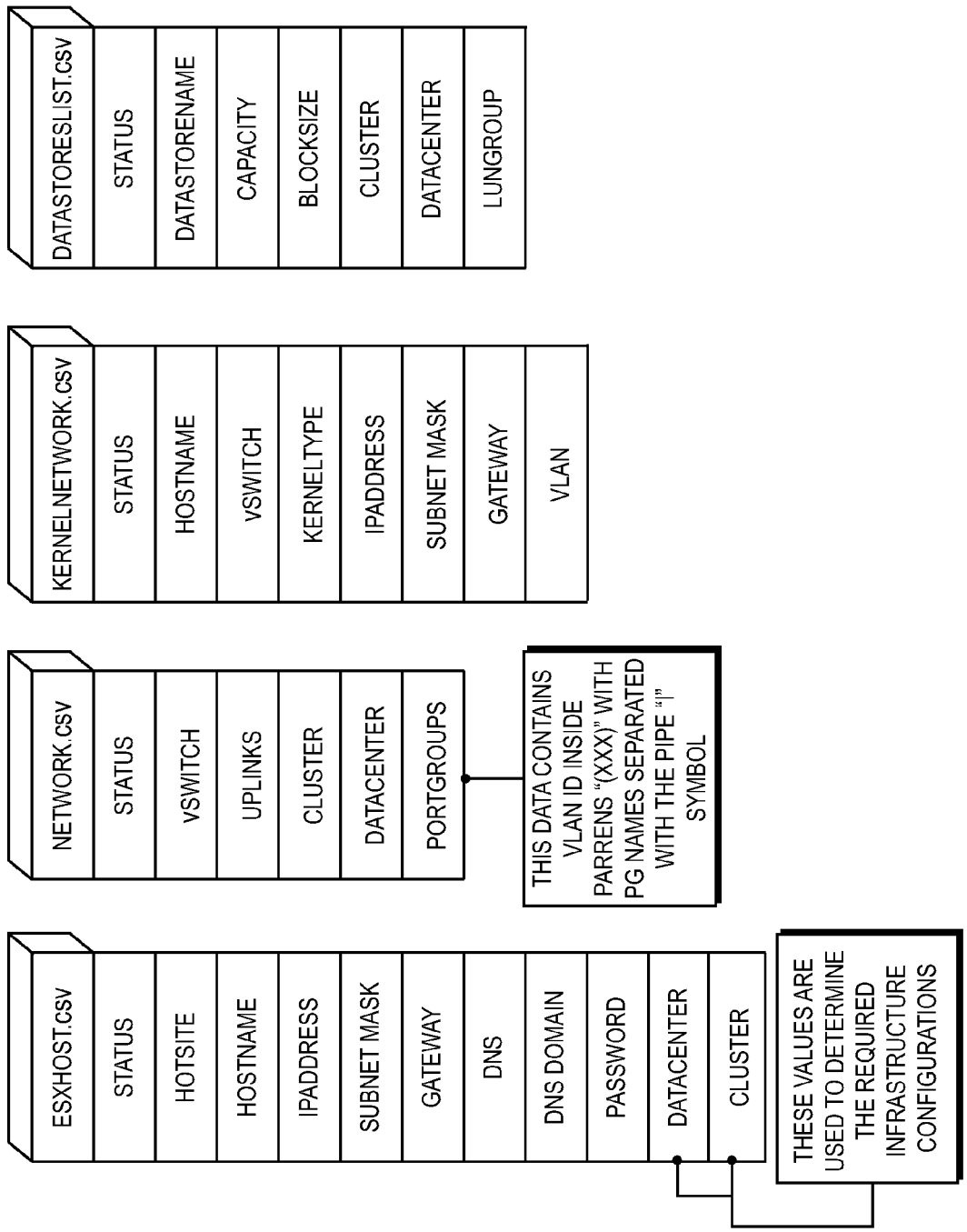
FIG. 7 illustrates a few of the configuration data files in an automation package.
Figure 8:
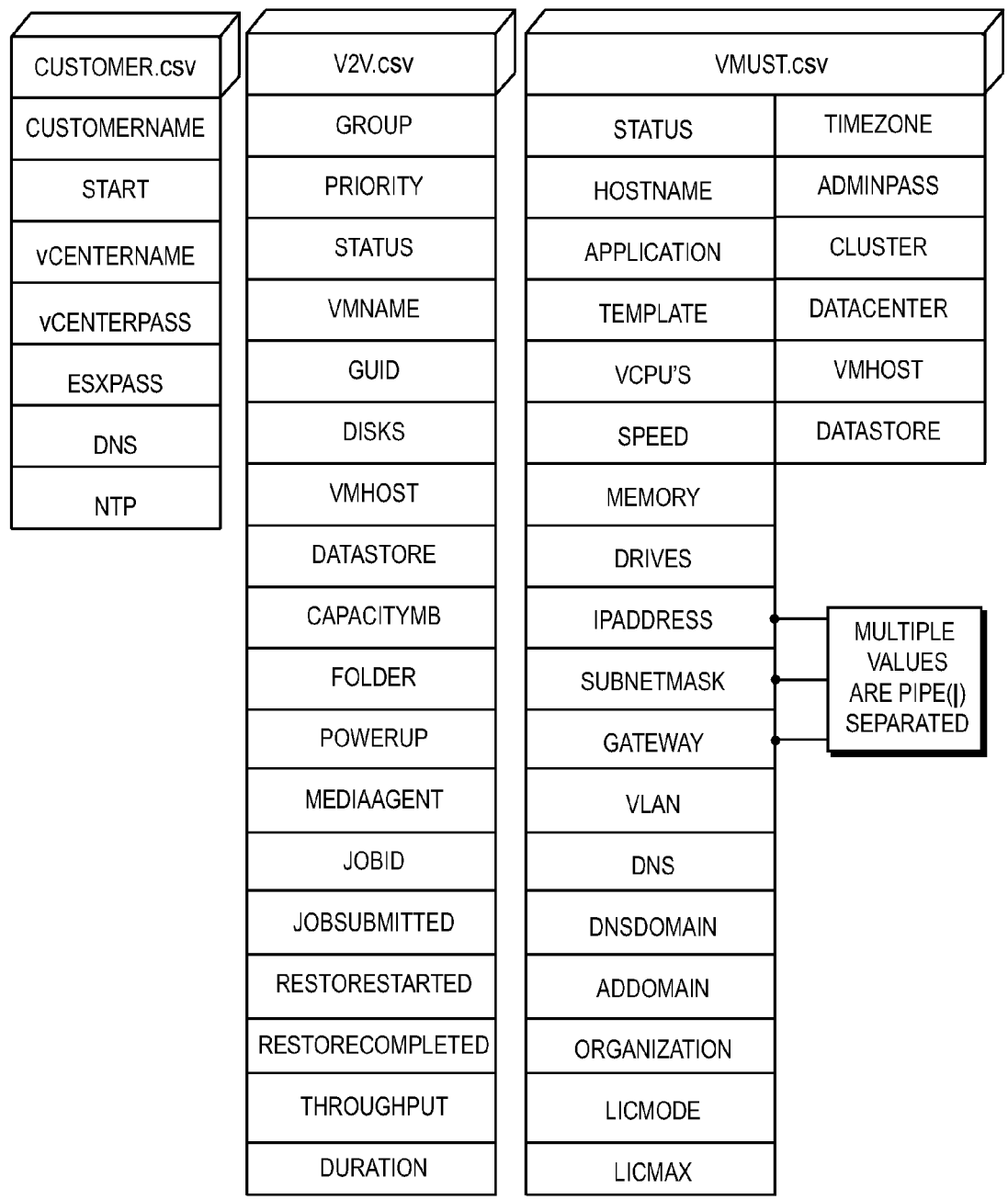
FIG. 8 illustrates still other configuration files.

The example ESXhost.CSV file shown in FIG. 7 includes fields such as a status field, hot site identifier, hostname, IP address, subnet mask, gateway, DNS, DNS domain, passwords, data center identifier, and cluster identifiers. The hot site information an identifier for a particular physical ESX server 302. It will have an IP address and DNS information and a data center and cluster assignment.

In a next operation, the VRA automation script 650 accesses the network.CSV file 603 to configure the required virtual networking for each ESX host. Virtual switches are then created and configured with the requested uplinks (physical network adapters) and port groups including the indicated VLAN information. These virtual network configurations are performed on a per cluster basis. A typical network.CSV file 603 includes a status field, virtual switch identifier, uplink, and cluster information as well as the associated data center and available port groups.

Next the kernelnetwork.CSV file 604 is accessed to configure the requested VM kernel interfaces. This is used for tools such as Vmotion, NFS and/or other management interfaces. An example kernel network CSV file 604 thus contains a status field, hostname, virtual switch identifier, kernel types, IP address, subnet mask, gateway, and ancillary information. These tools for example provide additional interfaces that ESX host can support under VMware.

The next file to be processed is the datastorelist.CSV 605 which contains data required to create the requested data stores. In this process one host 302 is selected a primary and it is tasked with starting configurations are completed on that post crosses was the process is completed the house Perform a rescan operation begin to utilize their created data stores. The datastorelist.CSV file typically contains status information, a name for the associated data store, data store operating information (such as its capacity, block size, the cluster and data center to which it is assigned) and additional configuration information.

The next file to be processed is VMlist.CSV 606. This file contains a hostname, operating system, processor specifications and network settings for each of the virtual machines required to be deployed. The automation 652 may start this step by first creating an OS customization specification based on the configuration data. This OS customization specification is then used to deploy a new virtual machine from a collection of virtual machine templates consisting of the required operating systems and associated processor configuration data.

Once the deployment is complete, the automation can reconfigure the resulting virtual machine with the required CPU, memory and virtual disk settings. Then, upon a first power on of the virtual machine, the OS customization spec is processed and the virtual machine is customized. Also during this step the virtual machines' detailed information (such as its IP address, operating system and notations) can be recorded in a description or notes parameter in virtual machine object, as well as loaded into other folders.

In addition to the virtual infrastructure configurations (clusters, network, storage, virtual machines) the automation package 650 can be used to scan VMFS and NFS data stores for existing virtual machines and register these virtual machines to be configured the Vcenter infrastructure. The operator has an option to register all virtual machines on any available host; or the operator can provide a specific CSV file to the automation process, which contains a list of virtual machines to register as well as the required destination. During this registration process certain virtual machine settings can be adjusted based on data in the CSV file. This includes the destination network and computing resources. This information can also be presented to the operator after the data store scan, the operator can then utilize it to select configuration changes.

An additional optional aspect of the automation processes is the ability to submit VMrestore jobs to a backup/recovery software. By using data from the production environment stored in CSV file, restore jobs can configure across specific the ESX hosts and data stores. These records can be grouped together by any number of methods such as the recovery time, application, and so forth.

An additional aspect of the automation can be to allow an operator to make configuration changes across a number of hosts, which may be all hosts or a subset of hosts. For example, an operator may need to add a virtual switch to all hosts in a cluster, or may possibly need to change the VLAN ID on a port group that exists on a only a certain number of host.

The customer.CSV file 607 lists information concerning the customer their virtual center name and other informational data only.

The V2V.CSV file 608 contains information that is needed to submit a VM restore job to the Backup recovery location, to restore virtual machines, that were running in the production environment. These may include be Vcenter restore options that can be executed once the restore hardware is powered up. The automation then brings the virtual machines back online by invoking a backup copy.

One final aspect of the automation could be to allow an operator to make configuration changes across a number of hosts from a GUI console. The operator may need to add a virtual switch or portgroup to all hosts in a cluster, or possible need to change the vlan id on a portgroup that exists on a number of hosts. Using this functionality the operator could configure a number of hosts from a central location or modify the configurations of a group of hosts.

Implementation Options

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for recovering a production environment which includes one or more physical and/or virtual machine infrastructure elements that together comprise one or more data centers, and where a recovery environment provides a managed recovery service for the infrastructure elements, the method carried out in the recovery environment, comprising:
    receiving a recovery automation data file containing configuration information for the physical infrastructure elements;
    receiving a virtual recovery automation file containing configuration information for the virtual infrastructure elements and a script file containing instructions to be executed in the recovery environment wherein configuration information in the virtual recovery automation file includes configuration information for hosts, networks, datastores, and virtual machines in the data centers;
    instantiating a recovery system for hosting one or more available physical machines of the same type as in the production environment, the physical machines allocated from a group of machines such that a number of available physical machines may vary over time;
    configuring physical machines in the recovery environment according to the virtual recovery automation file;
    instantiating virtual machines in the recovery environment according to the virtual recovery automation file; and
    executing the script file within the recovery system to configure the recovery environment.

2. The method of claim 1 wherein the virtual machines in the recovery environment are managed by a hypervisor.

3. The method of claim 1 wherein the virtual recovery automation package further includes specification for recovering physical machines in the production environment as virtual machines in the recovery environment.

4. The method of claim 1 wherein the configuration files are comma separated value files.

5. The method of claim 1 wherein the recovery machines are managed by a Vcenter server and the recovery machines are ESX hosts.

6. The method of claim 1 further comprising:
allocating physical machines from a list of physical machines reported as being available from a recovery service provider; and
executing the scripts on the physical machines thus allocated.

7. The method of claim 3 wherein a target location of the virtual machines in the recovery environment is specified according to the virtual recovery automation file.

8. The method of claim 3 wherein compute specifications including one or more of Central Processing Unit (CPU), Random Access Memory (RAM) or disk storage for virtual machines in the recovery environment are modified and/or specified according to the virtual recovery automation file.

9. The method of claim 8 wherein network configurations of virtual machines in the recovery environment are modified according to the virtual recovery automation file.

10. The method of claim 8 wherein virtual machines in the recovery environment are organized according to the virtual recovery automation file.

11. The method of claim 1 further comprising:
performing specified system checks including at least network and storage verification prior to execution of the script file.

12. The method of claim 1 wherein the virtual recovery automation file specifies configuration changes to be applied to a set of virtual machines in the recovery environment.

13. The method of claim 12 wherein the set of virtual machines to which the specification changes are applied includes all virtual machines in the recovery environment.

14. A data processing system recovery environment for providing a managed recovery service for a production environment which includes one or more physical and/or virtual machine infrastructure elements that together comprise one or more data centers comprising:
a recovery system that includes
one or more physical data processors for providing the managed recovery service that further comprise:
a communication interface and memory for receiving and storing
(a) a recovery automation data file containing configuration information for the physical infrastructure elements;
(b) a virtual recovery automation data file containing configuration information for the virtual infrastructure elements wherein configuration information in the virtual recovery automation includes configuration information for hosts, networks, datastores, and virtual machines;
(c) a script file containing instructions to be executed in the recovery environment;
the physical machines allocated from a group of machines in the recovery environment such that a number of available physical machines may vary over time;
the processor(s) executing one or more programs to
configure the physical machines in the recovery system according to the virtual recovery automation file;
instantiate virtual machines in the recovery system according to the virtual recovery automation file; and
execute the script file within the recovery system to configure the recovery environment.

15. The system of claim 14 additionally comprising:
a hypervisor for managing the virtual machines.

16. The system of claim 14 wherein the virtual recovery automation package further includes a specification for recovering physical machines in the production environment as virtual machines in the recovery environment.

17. The system of claim 14 wherein the configuration files are comma separated value files.

18. The system of claim 14 further comprising:
a vCenter server for managing the physical machines; and
wherein the physical machines in the system are ESX hosts.

19. The system of claim 14 further wherein the physical machines are allocated from a list of physical machines reported as being available from a recovery service provider.

20. The method of claim 1 further comprising, after the step of configuring physical machines:
receiving a report from a recovery automation server that physical machines have been deployed;
copying the virtual recovery automation file to the deployed physical machines; and
executing the script file against the configuration data in the virtual recovery file.

21. A system for providing a managed recovery service for recovering a customer production environment to a recovery environment, the system comprising:
a recovery automation server located in the recovery environment, the recovery automation server comprising a memory for storing a recovery automation package including at least a virtual recovery automation file that includes a virtual recovery automation script file and configuration information for infrastructure elements in the customer production environment, wherein the configuration information further comprises a plurality of configuration files including:
a host configuration file including for each host in the data center a host name, address, data center identifier, and cluster assignment;
a network configuration file including virtual network configurations, virtual switch identifier, addresses, uplinks, and port groups;
a kernel network file including for each virtual host a host name, virtual switch identifier, kernel types, network address, subnet mask, and gateway;
a data store file including information indicating a primary host for the data store, host names, and data store information including capacity, block size, and cluster to which the data store is assigned; and
a virtual machine file including a hostname, operating system, processor specifications and network settings for each of the virtual machines required to be deployed;
the recovery automation server further executing one or more stored programs to:
allocate two or more physical servers from a server farm allocated to the managed recovery service;
allocate one or more data stores;
allocate low-level network functions to enable at least one physical network connection between the physical servers and data stores;
allocate a management server from the server farm;
configure the management server and allocated servers with Internet Protocol (IP) addresses;

connect the management server to the physical servers and data stores using at least one network connection;

subsequent to the steps recited above, the management server to further execute the virtual recovery automation script file to:

register one or more hosts as per the host configuration file;

assign hosts to clusters in a hierarchy as per the host configuration file;

configure virtual networking elements including two or more virtual switches, port groups, uplinks, or virtual machine (VM) kernels from the virtual kernel as per the kernel network file;

configure one or more data stores as per the data store configuration file;

deploy one or more virtual machines by assigning virtual machines to hosts as per the virtual machine configuration file;

preconfigure the virtual machines with processor, memory, and storage attributes as per the virtual machine file; and power on the virtual machines.

* * * * *